United States Patent
Yamamoto (10) Patent No.: US 6,577,751 B2
(45) Date of Patent: *Jun. 10, 2003

(54) IMAGE PROCESSING METHOD CAPABLE OF CORRECTING RED EYE PROBLEM

(75) Inventor: Hiroyasu Yamamoto, Kanagawa (JP)

(73) Assignee: Fuji Photo Film Co., Ltd., Kanagawa (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/330,088
(22) Filed: Jun. 11, 1999

(65) Prior Publication Data
US 2002/0122588 A1 Sep. 5, 2002

(30) Foreign Application Priority Data
Jun. 11, 1998 (JP) ............................ 10-163195

(51) Int. Cl.$^7$ ................................. G06K 9/00
(52) U.S. Cl. ........................ 382/117; 358/1.9
(58) Field of Search ................ 382/103, 116, 382/117, 298, 309; 345/328, 349, 355, 431; 358/1.6, 1.9, 1.18, 451, 506, 449, 500; 396/18, 287, 299; 351/206

(56) References Cited

U.S. PATENT DOCUMENTS

| | | | |
|---|---|---|---|
| 5,130,789 A | * 7/1992 | Dobbs et al. | 358/500 |
| 6,122,069 A | * 9/2000 | Kendall et al. | 358/1.9 |
| 6,154,755 A | * 11/2000 | Dellert et al. | 358/449 |
| 6,204,858 B1 | * 3/2001 | Gupta | 345/431 |
| 6,320,672 B1 | * 11/2001 | Itoh | 358/1.9 |

* cited by examiner

Primary Examiner—Samir Ahmed
Assistant Examiner—Vikkram Bali
(74) Attorney, Agent, or Firm—Birch, Stewart, Kolasch & Birch, LLP (57) ABSTRACT

The image processing method performs prescan for capturing an image of a frame on a film at low resolution, determines image processing conditions using image data obtained by the prescan, represents the image captured with the prescan on a display, selects the frame or frames to be subjected to red eye correction by using the represented image captured with the prescan, performs fine scan for capturing the image on the film at high resolution, obtains output image data by processing fine scanned image data in accordance with the image processing conditions, sets red eye correcting conditions for the thus selected frame or frames by using the fine scanned data, and subjects the fine scanned data of the image of the selected frame to the red eye correction in accordance with the red eye correcting conditions. As a result, the method is capable of effective red eye correction during the making of simultaneous prints so that high-quality images without the red-eye problem can be output in a consistent manner.

5 Claims, 5 Drawing Sheets

FIG.5B

IMAGE PROCESSING METHOD CAPABLE OF CORRECTING RED EYE PROBLEM

BACKGROUND OF INVENTION

This invention relates to the field of digital image processing technology for typical use with digital photoprinters that read film images photoelectrically to produce prints (photographs) reproducing the images. More particularly, the invention relates to an image processing method that is capable of effective correction of the "red eye" problem with human subjects taken with the aid of an electronic flash.

Heretofore, the images recorded on photographic films such as negatives and reversals (which are hereunder referred to simply as "films") have been commonly printed on light-sensitive materials (photographic paper) by means of direct (analog) exposure in which the film image is projected onto the light-sensitive material to achieve its areal exposure.

A new technology has recently been introduced and this is a printer that relies upon digital exposure. Briefly, the image recorded on a film is read photoelectrically, converted to digital signals and subjected to various image processing operations to produce image data for recording purposes; recording light that has been modulated in accordance with the image data is used to scan and expose a light-sensitive material to record a latent image, which is subsequently developed to produce a (finished) print. The printer operating on this principle has been commercialized as a digital photoprinter.

In the digital photoprinter, images are converted to digital image data which are processed to determine the exposing conditions for printing. Hence, the digital photoprinter is capable of performing effective image processing operations such as the correction of washed-out highlights or flat shadows due to the taking of pictures with back light or an electronic flash, sharpening and the correction of under- or over-exposure and this enables the production of high-quality prints that have been impossible to attain by the conventional direct exposure technique. In addition, not only the assembling of plural images and the dividing of a single image but also the compositing of characters on image can be performed by processing the image data and, as a result, prints can be outputted after various editing and/or processing operations have been performed in accordance with specific uses. Outputting images as prints (photographs) is not the sole capability of the digital photoprinter; the image data can be supplied into a computer or the like and stored in recording media such as a floppy disk; hence, the image data can be put to various non-photographic uses.

Having these features, the digital photoprinter is basically composed of the following units: a scanner (image reading apparatus) that reads the image on a film photoelectrically; an image processing apparatus that processes the captured image to determine the exposing conditions for recording the image; and a printer (an image recording apparatus) that scan exposes a light-sensitive material in accordance with the determined exposing conditions and which then performs development and other necessary processing to produce prints.

In the scanner, reading light issuing from a light source is allowed to be incident on a film, from which projected light bearing the image recorded on the film is produced and focused by an imaging lens to form a sharp image on an image sensor such as a CCD sensor; the image is then captured by photoelectric conversion and sent to the image processing apparatus as image data for the film (i.e., image data signals) after being optionally subjected to various image processing steps.

In the image processing apparatus, image processing conditions are set on the basis of the image data captured with the scanner and image processing as determined by the thus set conditions is performed on the captured image data and the resulting output image data for image recording (i.e., exposing conditions) are sent to the printer.

In the printer, if it is of a type that relies upon exposure by scanning with an optical beam, the latter is modulated in accordance with the image data sent from the image processing apparatus and deflected in a main scanning direction as the light-sensitive material is transported in an auxiliary scanning direction perpendicular to the main scanning direction, whereby a latent image is formed as the result of exposure (printing) of the light-sensitive material with the image bearing optical beam. Development and other processing as determined by the light-sensitive material are then performed to produce a print (photograph) reproducing the image that was recorded on the film.

With prints such as portraits that contain human subjects in the image, the most important factor to the image quality is how fine the human subject is finished. Therefore, the phenomenon of "red eye" in which the eyes (or pupils) of a human subject appears red due, for example, to the reflection of light from an electronic flash used in shooting is a serious problem indeed.

As already mentioned, the image processing apparatus of the digital photoprinter produces image data for output by performing image processing on the image data captured with the scanner. This means that an appropriate image can be output by modifying the red eye through image data processing. A known method of correcting the red eye problem is by using a commercial image processing tool such as PhotoRetouch to extract the image data on the eye region of an image of interest and perform a processing scheme such as transforming the color of the eyes (i.e., the image data on them).

To perform this conventional process of red eye correction, it is necessary that the occurrence of red eye in a particular image (or frame) be already known. Therefore, in reprinting (remaking) a simultaneous print having the red eye problem, the conventional process of red eye correction is suitable for outputting prints in which the red eye is adequately corrected. On the other hand, in the case of processing a film from which prints are to be prepared for the first time (e.g. simultaneous prints) in large volumes and in an efficient way, it is extremely difficult to ensure positive correction of the red eye that has occurred. From a practical viewpoint, it is almost impossible to make simultaneous prints and yet perform red eye correction so that prints without the red eye problem can be output in a consistent manner.

SUMMARY OF THE INVENTION

The present invention has been accomplished under these circumstances and has as an object providing a digital image processing method in which the image recorded in a photographic film is captured photoelectrically and the obtained image data is subjected to specified image processing schemes to produce image data for output, and which is capable of effective red eye correction during the making of simultaneous prints so that high-quality images without the red-eye problem can be output in a consistent manner.

The stated object of the invention can be attained by an image processing method comprising the steps of performing prescan for capturing an image on a film at low resolution, determining image processing conditions using image data obtained by prescan, performing fine scan for capturing the image on the film at high resolution, and obtaining output image data by processing fine scanned image data in accordance with the image processing conditions, characterized in that the image captured with the prescan is represented on a display and used to select a frame or frames to be subjected to red eye correction, red eye correcting conditions for the thus selected frame or frames are set based on the fine scanned data and said selected frame or frames are subjected to said red eye correction in accordance with said red eye correcting conditions.

In a preferred embodiment, said fine scan is performed after all frames of the film have ended prescan and the frame or frames designated for said red eye correction is subjected to fine scan before any other frames or, alternatively, all frames are fine scanned consecutively.

In another preferred embodiment, either the fine scanned image data or the prescanned image data or both are used to represent a result of the red eye correction on the display.

In yet another preferred embodiment, image data for index prints is prepared using the prescanned data and the prescanned data that has been subjected to the red eye correction is used to prepare the index prints for the frame or frames that have been designated for the red eye correction.

One of preferable examples of the image processing method of the invention has following constituents.

The prescan performing step, the determining step, a step of representing a plurality of the prescan captured images of the frames on the display after all frames of the film have ended the prescan, and a step of selecting and designating a frame to be subjected to the red eye correction among the represented frames on the display are carried out in order.

One of a process for performing the red eye correction on the designated frame and a step of performing verification based on the prescanned image data on a frame not designated is repeated from a first frame to a last frame on the film.

The red eye correction process comprises a step of performing the fine scan on the designated frame to obtain the fine scan image data, a step of representing the image of the designated frame on the display based on the thus obtained fine scan image data, a step of setting the red eye correcting conditions for the designated frame, a step of subjecting the designated image to the red eye correction based on the fine scanned image data according to the red eye correcting conditions, a step of subjecting the designated image to the red eye correction based on the prescanned image data according to the red eye correcting conditions, a step of representing the image of the designated frame subjected to the red eye correction based on the prescanned image data on the display and a step of subjecting the image of the represented and designated frame based on the prescanned image data to the verification other than red eye.

All of the frames not designated are subjected to the fine scan from the frame of one end of the film to the frame of another end of the film after the frame of the one end of the film is returned to a start position.

In another preferable example of the present invention, the prescan performing step, the determining step and the prescan image representing step are carried out in the same way to the above example. Thereafter, in the selecting and designating steps, (all) frames to be subjected to the red eye correction are previously selected and designated on the one screen of the display (monitor).

Next, a plurality of the frames represented on the one screen of the display are subjected to the verification processing, and then the fine scan of the plurality of the frames of the one screen is started.

After the designated frame is subjected to the fine scan to obtain the fine scan image data, the fine scan image data of the designated frame is represented on the display. The red eye correction is performed on the represented frame on the display.

The reset of frame or frames which is not designated is subjected to the fine scan, if the there is the rest.

The other preferable example of the present invention is similar to the another preferable example up to the starting of the fine scan.

In this example, the frame or frames to be subjected to the red eye correction is not subjected to the fine scan.

After the verification and the fine scan of all frames of one case (one film) end, the frame of the one end of the film is returned to the start position.

Thereafter, only the designated frame to be subjected to the red eye correction is subjected to the fine scan, the fine scan image data of the designated frame is represented on the display, and the red eye correction is performed on the represented frame on the display.

DETAILED DESCRIPTION OF INVENTION

The image processing method of the invention is now described in detail with reference to the preferred embodiments shown in the accompanying drawings.

Figure 1:
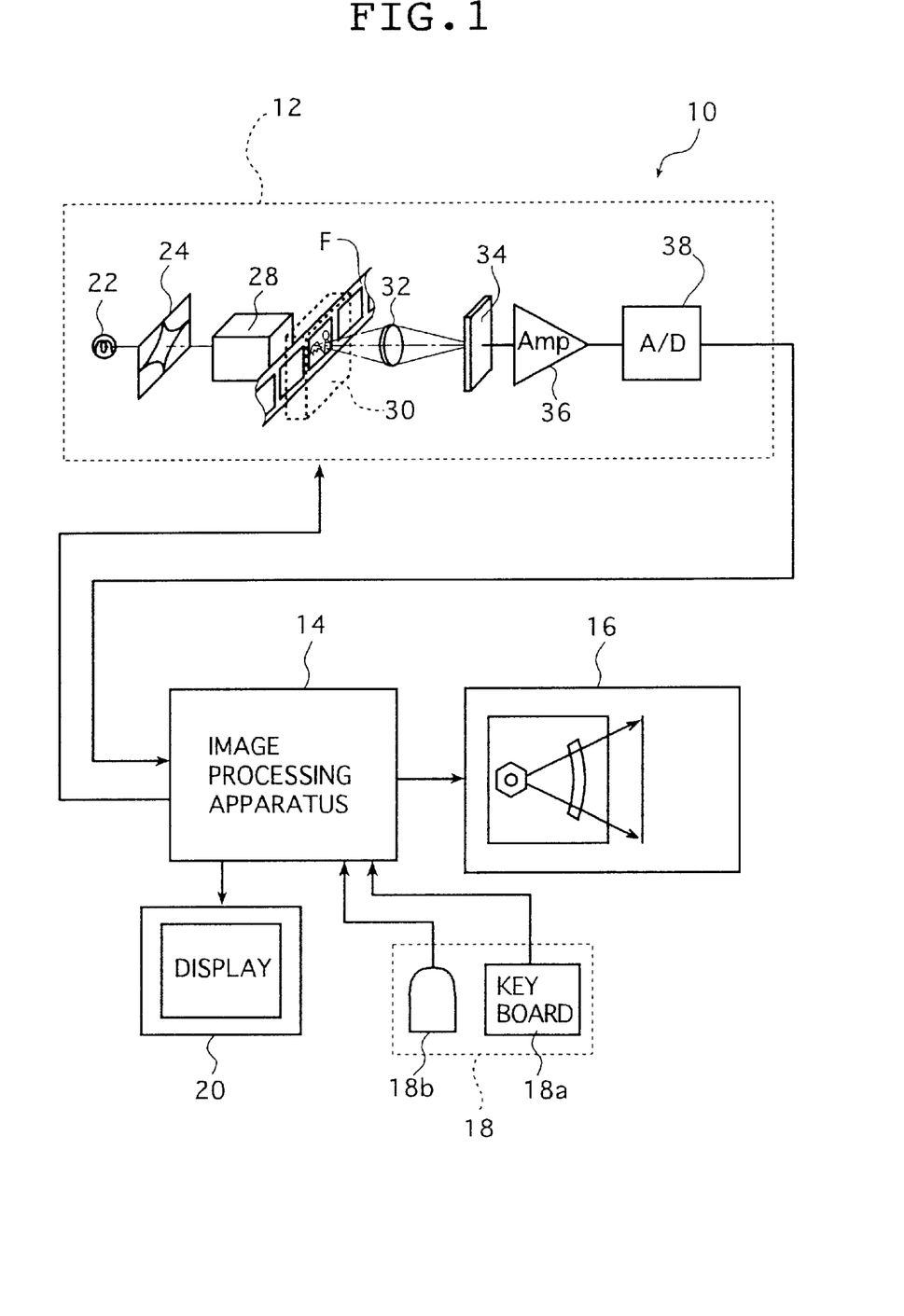
FIG. 1 is a block diagram of a digital photoprinter implementing the image processing method of the invention.

FIG. 1 is a block diagram of an exemplary digital photoprinter using the image processing method of the invention. The digital photoprinter shown in FIG. 1 (which is hereunder referred to simply as "photoprinter 10") comprises basically a scanner (image reading apparatus) 12 for photoelectrically reading the image recorded on a film F, an image processing apparatus 14 which performs image processing on the thus read image data (image information) and with which the photoprinter 10 as a whole is manipulated and controlled, and a printer 16 which performs imagewise exposure of a light-sensitive material (photographic paper) with light beams modulated in accordance with the image data delivered from the image processing apparatus 14 and which performs development and other necessary processing to produce a (finished) print.

Connected to the image processing apparatus 14 are a manipulating unit 18 having a keyboard 18a and a mouse 18b for inputting (setting) various conditions, selecting and commanding a specific processing step and entering a command and so forth for effecting color/density correction, as well as a display 20 for representing the image captured with the scanner 12, various manipulative commands and pictures for setting and registering various conditions.

The scanner 12 is an apparatus with which the images recorded on the film F are read photoelectrically frame by frame. It comprises a light source 22, a variable diaphragm 24, a diffuser box 28 which diffuses the reading light incident on the film F so that it becomes uniform across the plane of the film F, an imaging lens unit 32, an image sensor having line CCD sensors capable of reading R (red), G (green) and B (blue) images, an amplifier (Amp) 36 and an A/D (analog/digital) converter 38.

In the photoprinter 10, dedicated carriers are available that can be loaded into the housing of the scanner 12 in accordance with the type of the film used (e.g. whether it is a film of the Advanced Photo System (APS) or a negative or reversal film of 135 size), the format of the film (e.g. whether it is a strip or a slide) or other factor. By replacing one carrier with another, the photoprinter 10 can be adapted to process various kinds of films in various modes. The images (frames) that are recorded on the film and which are subjected to the necessary procedure for print production are transported to and held in a specified reading position by means of the carriers.

The scanner 12 captures the images recorded on the film F in the following manner; the reading light from the light source 22 has its quantity adjusted by means of the variable diaphragm 24 and is incident on the film F held in the specified reading position by means of the carrier and thereafter passes through the film to produce projected light bearing the image recorded on the film F.

Figure 2A:
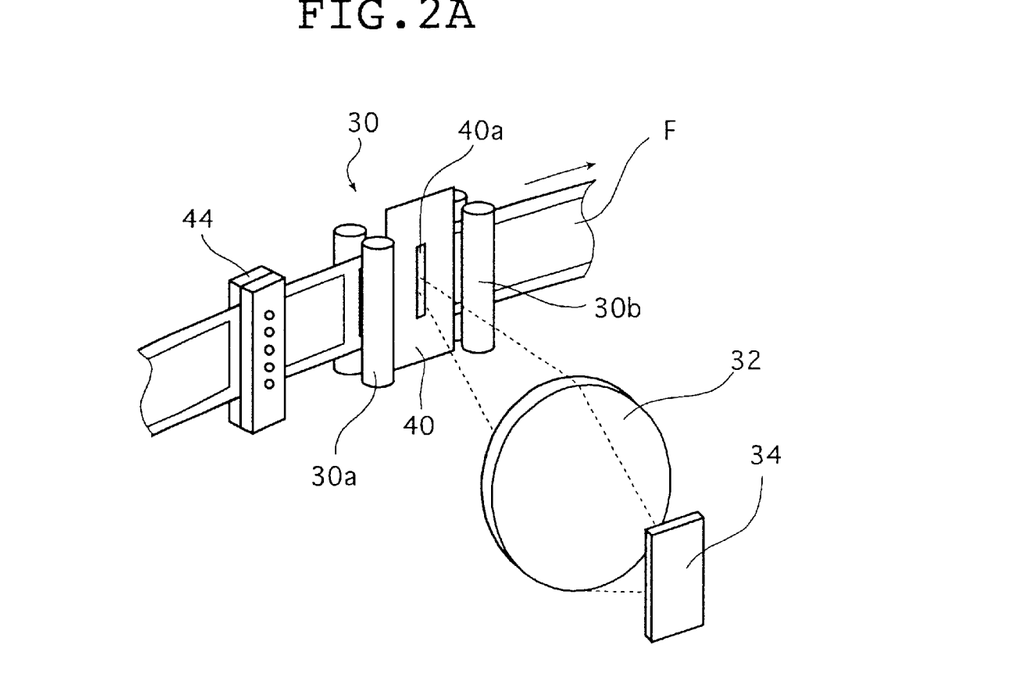
FIG. 2A shows in conceptual form the carrier that is to be mounted on the digital photoprinter shown in FIG. 1.

As shown schematically in FIG. 2A, the illustrated carrier 30 has a pair of transport roller pairs 30a and 30b and a mask 40 having a slit 40a. The transport rollers 30a and 30b are provided on opposite sides of the specified reading position in an auxiliary scanning direction which is perpendicular to the main scanning direction (i.e., the direction in which the line CCD sensors in the image sensor 34 extend) and they transport the film F with its length being parallel to the auxiliary scanning direction as it is in registry with the reading position. The slit 40a defines the projected light from the film F to have a specified narrow shape, is in registry with the reading position and extends in the main scanning direction.

Being held in registry with the reading position, the film F is transported in the auxiliary scanning direction by means of the carrier 30 as it is illuminated with the reading light. Consequently, the film F is subjected to two-dimensional slit scan with the reading light passing through the slit 40a extending in the main scanning direction, whereupon the image of each frame recorded on the film F is captured.

Indicated by 44 is a code reader for reading various bar codes such as DX code, expanded DX code and FNS code that are recorded optically on the film.

Magnetic recording media are preliminarily formed on an APS film and the carrier adapted to handle the APS film (or its cartridge) has magnetic heads that read the information recorded on the magnetic recording media and which also record the necessary information. As the image on the film F is being captured, the magnetic heads read the magnetic information so that the necessary information is sent from the scanner 12 to the image processing apparatus 14.

Figure 2B:
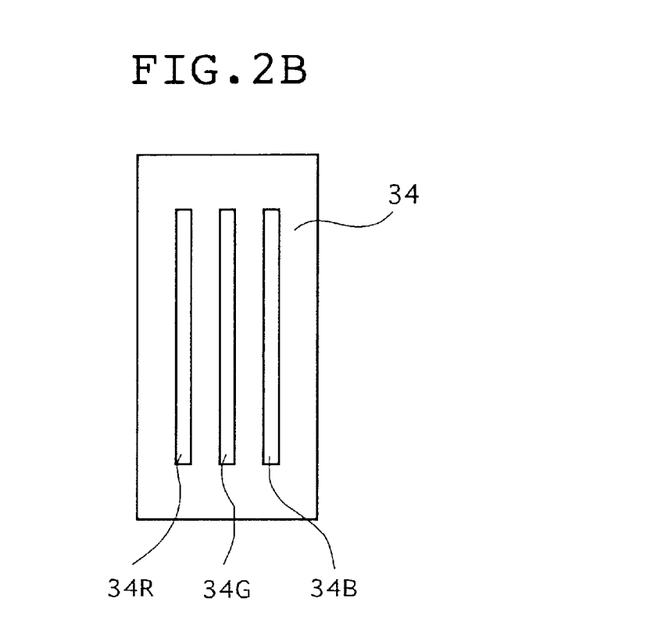
FIG. 2B shows in conceptual form the image sensor in the digital photoprinter shown in FIG. 1.

As already mentioned, the reading light passes through the film F held on the carrier 30 and the resulting image bearing, projected light is focused by the imaging lens unit 32 to form a sharp image on the light-receiving plane of the image sensor 34. As shown in FIG. 2B, the image sensor 34 is a 3-line color CCD sensor comprising a line CCD sensor 34R for reading a R image, a line CCD sensor 34G for reading a G image, and a line CCD sensor 34B for reading a B image. As already mentioned, the respective line CCD sensors extend in the main scanning direction. The projected light from the film F is separated into three primary colors R, G and B and captured photoelectrically by means of the image sensor 34.

The output signals from the image sensor 34 are amplified with Amp 36, converted to digital form in A/D converter 38 and sent to the image processing apparatus 14.

In the scanner 12 of the invention, the images recorded on the film F are captured by two scans, the first being prescan at low resolution and the second being fine scan for obtaining output image data. Prescan is performed under preset reading conditions that ensure that the images on all films to be handled by the scanner 12 can be read without saturating the image sensor 34. Fine scan uses the prescanned data and is performed under reading conditions that are set for each frame such that the image sensor 34 is saturated at a slightly lower density than the minimum density of the image (frame) of interest. Hence, the output signals for prescan and fine scan are essentially the same data except for resolution and output level.

As will be described later in detail, the image read by prescan in the image processing method of the invention is represented on the display 20 and the operator, looking at the displayed image, selects the frame or frames which should be subjected to red eye correction. Prescan, therefore, should be performed at a sufficiently high resolution that the operator looking at the image represented on the display 20 can learn that red eye has occurred. Alternatively, two different modes may be set, one being for identifying the occurrence of the red eye problem and performing its correction and the other being a mode in which red eye correction is not performed at all, and the reading conditions for prescan are altered between the two modes.

In the digital photoprinter using the invention, the scanner is by no means limited to a type that relies upon the slit scan technique described above but it may be of a type that relies upon areal exposure, or a technique by which the image in one frame is scanned across at a time.

In the illustrated example, the only image data supply source used is the scanner 12 which captures photoelectrically the images recorded on films such as negatives and reversals. It should, however, be noted that the photoprinter 10 using the invention may receive image data from various other image data supply sources including apparatus for reading the images on reflection originals, imaging devices such as a digital camera, communication means such as on-line communication systems and recording media such as floppy disks (or their drives) so that prints are prepared from the received image data.

As already mentioned, the output signals (image data) from the scanner 12 are output to the image processing apparatus 14.

Figure 3:
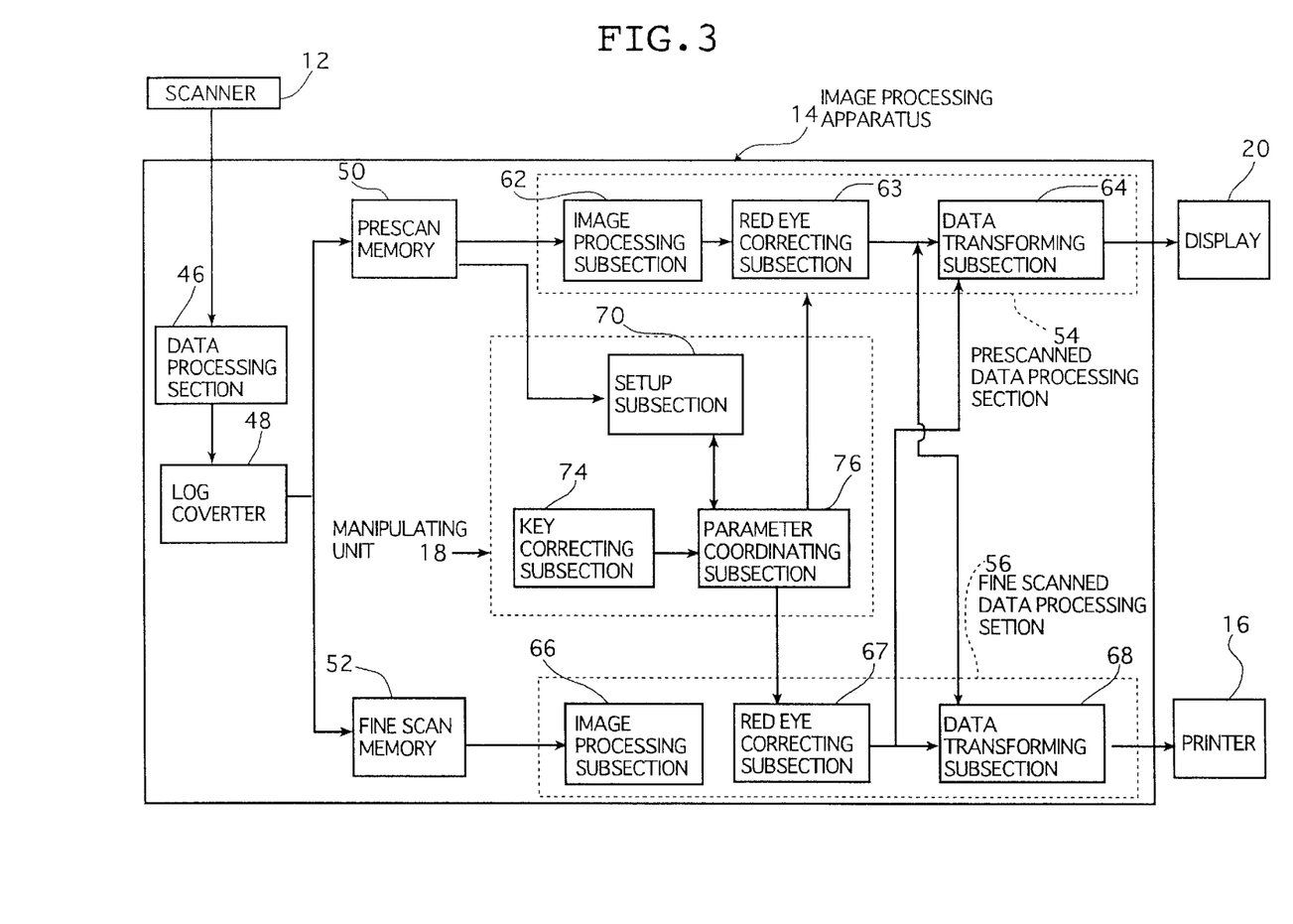
FIG. 3 is a block diagram showing an example of the image processing apparatus in the digital photoprinter shown in FIG. 1.

FIG. 3 is a block diagram of the image processing apparatus 14. As shown, the image processing apparatus 14 (which is hereunder referred to as "processing apparatus 14") comprises a data processing section 46, a log converter 48, a prescan (frame) memory 50, a fine scan (frame) memory 52, a prescanned data processing section 54, a fine scanned data processing section 56, and a conditions setting section 58.

FIG. 3 shows only the parts related to image processing and besides these parts, the processing apparatus 14 includes a CPU for controlling and managing the overall operation of the photoprinter 10 including the processing apparatus 14, memories for storing the information necessary for the operation and otherwise of the photoprinter 10, and means of determining the stop-down value of the variable diaphragm 24 and the storage time of the CCD sensor 34 in the process of fine scan. The manipulating unit 18 and the display 20 are connected to related parts via the CPU and the like (CPU bus).

The R, G and B output data from the scanner 12 are sent to the data processing section 46, where they are subjected to specified steps such as DC offset correction, dark correction and shading correction. Thereafter, the processed data are transferred into the log converter 48, where they are converted to digital form (density data), of which prescanned (image) data is stored in the prescan memory 50 and fine scanned (image) data is stored in the fine scan memory 52.

The prescanned data stored in the prescan memory 50 is processed in the prescanned data processing section 54 whereas the fine scanned data stored in the fine scan memory 52 is processed in the fine scanned data processing section 56. The prescanned data processing section 54 comprises an image processing subsection 62, a red eye correcting subsection 63 and a data transforming subsection 64. The fine scanned data processing section 56 comprises an image processing subsection 66, a red eye correcting subsection 67 and a data transforming subsection 68.

The image processing subsection 62 in the prescanned data processing section 54 and the image processing subsection 66 in the fine scanned data processing section 56 are the sites where the image data is subjected to specified image processing steps in accordance with the image processing conditions that are set by means of the conditions setting section 58 to be described later in this specification. The two image processing subsections 62 and 66 perform basically the same processing except for the pixel density of the image data that are to be processed.

The image processing schemes to be performed in the image processing subsections 62 and 66 include gray balance adjustment, tonal adjustment, density adjustment, chroma adjustment, dodging (compressing/extending the density's dynamic range) and sharpening. These operations are performed by known methods which are appropriate combinations of processing with LUTs (look-up tables), matrix (MTX) operations, processing with filters and so forth.

The red eye correcting subsections 63 and 67 are sites for performing red eye correction on the frame or frames that have been designated by the operator as one or ones that need be subjected to red eye correction. The image data on the frames that have not been designated for red eye correction simply passes unprocessed through these red eye correcting subsections or, alternatively, it bypasses these subsections to be sent to the downstream data transforming subsections.

The method of red eye correction is not limited in any particular way and various known methods may be employed. In an exemplary method suitable for the illustrated case, the operator performs the following steps: slicing a region containing the eyes from the image represented on the display 20, constructing a luminance histogram using the image data for the sliced region, extracting a low-luminance region from the luminance histogram, contracting the extracted low-luminance region to extract the entire eye region, and subjecting the extracted eye region to certain processing schemes such as hue transformation and chroma reduction.

An exemplary method of red eye correction by hue transformation is this: provide available data on the colors of various eyes (e.g., black and blue eyes), designate the color of eyes peculiar to the human subject, and transform the image data on the eye region to a desired set of eye color data. If the human subject has black eyes, red eye correction can be accomplished by reducing the chroma of the eye region until it approaches an achromatic color.

The data transforming subsection 64 of the prescanned data processing section 54 is a site where the prescanned data that has been processed in the image processing subsection 62 and, optionally, further in the red eye correcting subsection 63 is transformed using 3D (three-dimensional) LUTs and the like into image data corresponding to the representation on the display 20.

The illustrated processing apparatus 14 is so adapted that the fine scanned data processed in the image processing subsection 66 of the fine scanned data processing section 56 and, optionally, further in the red eye correcting subsection 67 can also be transferred to the data transforming subsection 64; with this design, depending on the need that typically arises in the case of red eye correction, the image in the fine scanned data can also be represented on the display 20.

The data transforming subsection 68 of the fine scanned data processing section 56 is similar to the data transforming subsection 64 in that it is a site where the fine scanned data that has been processed in the image processing subsection 66 and, optionally, further in the red eye correcting subsection 67 is transformed using 3D LUTs and the like and supplied to the printer 16 as image data suitable for image recording with the printer 16.

The illustrated processing apparatus 14 is so adapted that the prescanned data processed in the image processing subsection 62 of the prescanned data processing section 54 and, optionally, further in the red eye correcting subsection 63 can also be transferred to the data transforming subsection 68; with this design, depending on the need, the prescanned image can also be output on a print. The prescanned image may be used in preparing index prints.

The conditions for the various processing schemes to be performed with the prescanned data processing section 54 and the fine scanned data processing section 56 are set by means of the conditions setting section 58, which comprises a setup subsection 70, a key correcting subsection 74 and a parameter coordinating subsection 76.

The setup subsection 70 basically uses the prescanned data for each frame to set (or calculate) the reading conditions for fine scan, as well as the conditions for the various image processing schemes to be performed in the prescanned data processing section 54 and the fine scanned data processing section 56, and supplies the thus determined conditions to the parameter coordinating subsection 76.

Specifically, the setup subsection 70 uses the prescanned data to perform various operations including the construction of density histograms and the calculation of various image characteristic quantities such as points indicating given percent frequencies on density histograms, as exemplified by average density, LATD (large-area transmission density), highlights (minimum density) and shadows (maximum density); in accordance with such density histograms and image characteristic quantities, the setup subsection 70 determines the reading conditions for fine scan in the manner already described above; further, in addition to the image characteristic quantities and so forth, the setup subsection 70 sets the aforementioned conditions for various image processing schemes (including the conditions for transformation).

In the processing apparatus 14 of the invention, the setup subsection 70 uses the fine scanned data to set the conditions for red eye correction, or the image processing that is to be performed in the aforementioned red eye correcting subsections 63 and 67. Hence, using image data of high resolution, appropriate red eye correction can be performed to output image of high quality.

The key correcting subsection 74 calculates the amounts of image correction typically in accordance with various commands for adjustment entered by means of a brightness (D) adjustment key, C (cyan), M (magenta) and Y (yellow) adjustment keys, a y (contrast) adjustment key, a sharpness adjustment key and a chroma adjustment key, all being set on the keyboard 18a, as well as by means of the mouse 18b; the thus calculated amounts of image correction are supplied to the parameter coordinating subsection 76.

After receiving the image processing conditions set by the setup subsection 70, the parameter coordinating subsection 76 sets the supplied image processing conditions in the prescanned data processing section 54 and the fine scanned data processing section 56; further, in accordance with the amounts of image correction as calculated by the key correcting subsection 74, the parameter coordinating subsection 76 corrects (adjusts) the image processing conditions set in various parts, as well as constructs the conditions for correcting them and setting those conditions in the two data processing sections 54 and 56.

As already mentioned, the image data processed in the prescanned data processing section 54 of the processing apparatus 14 is sent to the display 20 whereas the image data processed in the fine scanned data processing section 56 is sent to the printer 16. The display 20 is not limited to any particular type and various known display means such as a CRT (cathode ray tube) and a liquid-crystal display may be employed.

The printer 16 exposes a light-sensitive material (photographic paper) in accordance with the image data to record a latent image and performs development and other necessary processing in a manner suitable to the light-sensitive material, thereby outputting a (finished) print.

To give one example of the printer's operation, the light-sensitive material is cut to a specified length in accordance with the size of the final print; thereafter, the printer records a back print and three light beams for exposure to R, G and B in accordance with the spectral sensitivity characteristics of the light-sensitive material (photographic paper) are modulated in accordance with the image data (image to be recorded); the three modulated light beams are deflected in the main scanning direction while, at the same time, the light-sensitive material is transported in the auxiliary scanning direction perpendicular to the main scanning direction so as to record a latent image; the latent image bearing light-sensitive material is subjected to a wet development process comprising color development, bleach-fixing and rinsing, then dried to produce a print; a plurality of prints thus produced are sorted and stacked.

Figure 4:
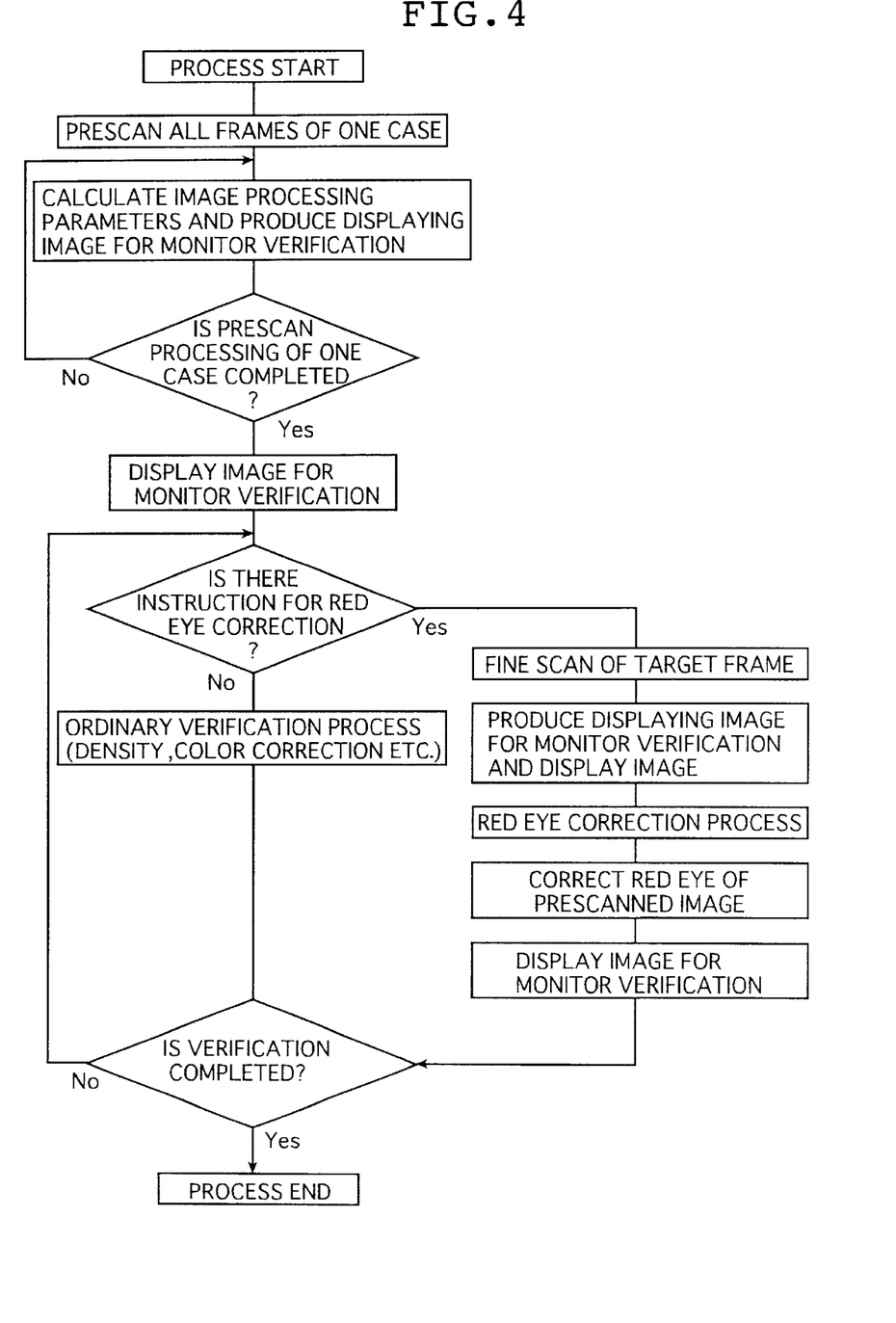
FIG. 4 is a flowchart showing an example of the image processing method of the invention.

We now describe the image processing method of the invention in greater detail by explaining the operation of the photoprinter 10 on reference to FIG. 4.

At the request of the photographer, the operator loads the scanner 12 with a carrier 30 that is associated with the film F, sets the APS film F (or its cartridge to be more exact) in a specified position on the carrier 30, enters the necessary information such as the size of the prints to be prepared, and thereafter keys in a command for starting print preparation. Thus, the process of the invention is started (See step S1 shown in FIG. 4).

In response to the START command, the stop-down value of the variable diaphragm 24 in the scanner 12 and the storage time of the image sensor (line CCD sensors) 34 are set in accordance with the reading conditions for prescan; thereafter, the carrier 30 unwinds the film F from the cartridge and transports it in the auxiliary scanning direction at a specified speed to start prescan; as already mentioned, the film F is subjected to slit scan in the specified reading position and the projected light is focused on the image sensor 34 so that the image recorded on the film F is captured photoelectrically as R, G and B separations.

During the transport of the film F, the magnetic information recorded on the magnetic recording medium and the bar codes such as DX code are read, whereupon the necessary information is sent to a specified site.

Both prescan and fine scan may be performed frame by frame. Alternatively, all frames may successively be subjected to prescan and fine scan. If desired, prescan and fine scan may continuously be performed on frame groups each consisting of a given number of frames.

The following is a preferred case in which fine scan is performed after the film F is continuously transported from end to end for prescanning all frames (one case) of the film F (See the step S2).

The output signals produced from the image sensor 34 by prescan are amplified by Amp 36 and sent to the A/D converter 38, where they are converted to digital form. The digital signals are sent to the processing apparatus 14, where they are given specified data processing steps in the data processing section 46 and converted to prescanned data (digital image data) in the log converter 48, with the prescanned data being then stored in the prescan memory 50.

The setup subsection 70 in the conditions setting section 58 reads the stored prescanned data out of the prescan memory 52, constructs density histograms, calculates image characteristic quantities such as highlights and shadows and performs any other necessary operations on a frame-by-frame basis to set the reading conditions for fine scan of successive frames, which are then supplied to the scanner 12. In addition to the density histograms and the calculated image characteristic quantities, the setup subsection 70 may receive an optionally entered operator's command to set the conditions such are parameters for the image processing steps to be performed on successive frames in the prescanned data processing section 54 and the fine scanned data processing section 56, and supplies the settings into the parameter coordinating subsection 76.

Upon receiving the image processing conditions such as the image processing parameters, the parameter coordinating subsection 76 sets them at a specified site (hardware) in the prescanned data processing section 54 and the fine scanned data processing section 56 (See the step S3).

If the image processing conditions have been set for all frames (See the step S4), the display 20 provides a screen for verification (shown in FIG. 5A) that involves the following steps (See the step S5 shown in FIG. 4): the prescanned data processing section 54 captures the prescanned data from the prescan memory 50; in the prescanned data processing section 54, the image data for each frame is processed with the associated image processing conditions to produce a simulated image (that simulates the finished image), that is, an image for monitor verification on the display 20.

Figure 5A:
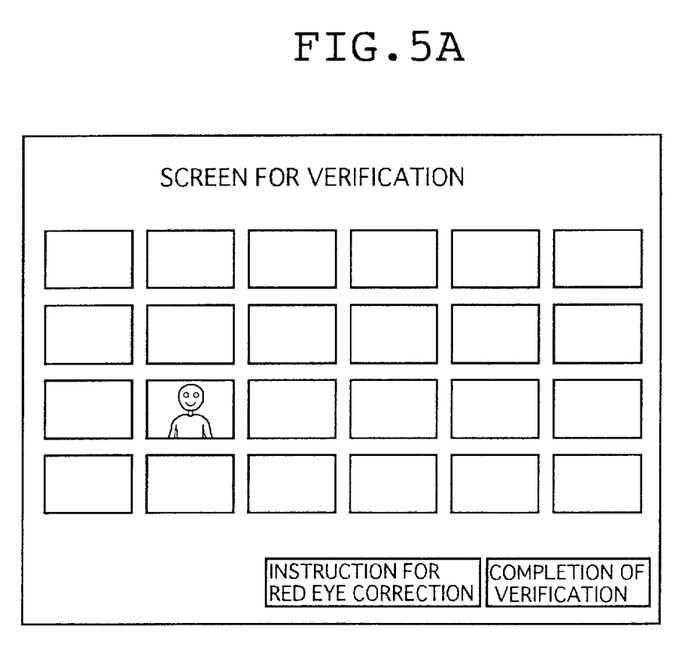
FIG. 5A is an illustration showing an example of a screen for verification.

The simulated image need not be displayed after the image processing conditions have been set for all frames of the film F and simulated images may be displayed in succession as the image processing conditions are sequentially set. It should also be noted that not all frames of the film F need be displayed simultaneously but a specified number of frames, say, six frames, may be displayed in succession in accordance with a specific situation, for example, the subsequent entry of an instruction for red eye correction.

Subsequently, the operator looking at the simulated image uses the mouse 18b or other suitable input device to select and instruct the frame or frames that need be corrected for red eye. Thereafter, only the selected target frame or frames are subjected to fine scan (or image capture equivalent to fine scan) (See the step S6 shown in FIG. 4 and FIG. 5A).

Fine scan of the target frame is performed in essentially the same manner as prescan except that the reading conditions are those for fine scan including the stop-down value of the variable diaphragm 24; the output signals from the image sensor 34 are amplified with Amp 36, converted to digital form in the A/D converter 38, processed by the data processing section 46 in the processing apparatus 14, converted to fine scanned data in the log converter 48 and sent to the fine scan memory 52 (See the step S7 shown in FIG. 4).

The fine scanned data being sent to the fine scan memory 52 is read by means of the fine scanned data processing section 56 which processes the fine scanned data for each frame in the image processing subsection 66 under the associated image processing conditions. The processed fine scanned data passes through the red eye correcting subsection 67 to be sent to the data processing subsection 64 of the prescanned data processing section 54. Following the data transformation, the screen changes from the verification mode to a red eye correction mode (See FIGS. 5A and 5B), whereupon the image from the fine scanned data for the particular frame is represented on the display 20 (See the step S8 shown FIG. 4).

Figure 5B:
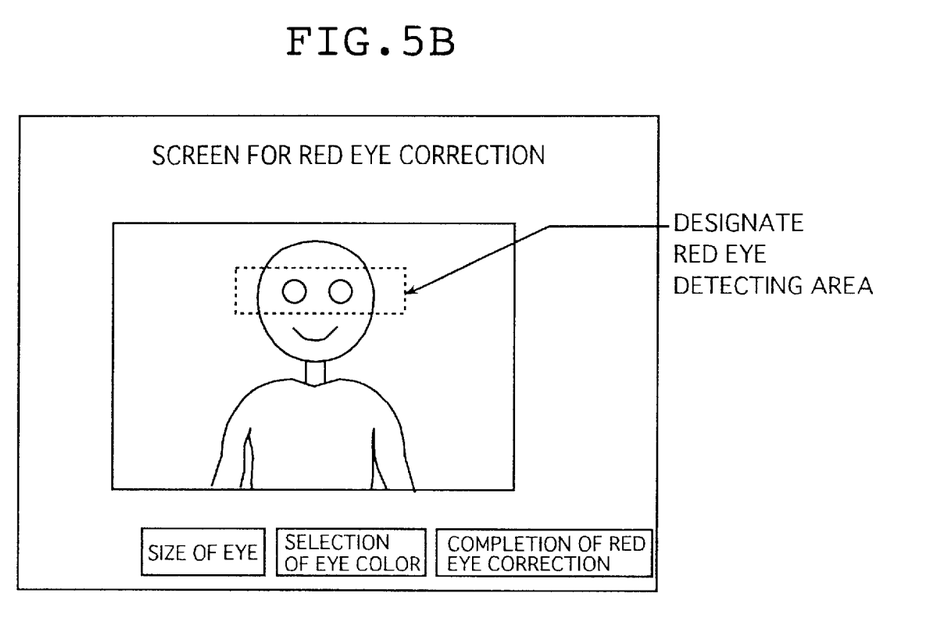
FIG. 5B is an illustration showing an example of a screen for red eye correction.

Looking at the image being represented on the display 20, the operator uses the mouse 18a or some other suitable input device to designate the area for detecting the red eye, that is, the eye containing region to slice it from the image (See FIG. 5B). Then, the fine scanned data for the sliced region is read by means of the setup subsection 70 and the conditions for red eye correction are determined (calculated) in the manner already described above and set in the red eye correction subsection 67 of the fine scanned data processing section 56. As the result, red eye correction is performed with the fine scanned data and the image from the fine scanned data being represented on the display 20 changes accordingly (See the step S9 show in FIG. 4).

If the operator, confirming that the frame of interest has been appropriately corrected for red eye, enters an input to that effect, the conditions for red eye correction are similarly set in the red eye correcting subsection 63 of the prescanned data processing section 54 and then the fine scanned image for the next frame for which red eye correction has been instructed is represented on the display 20 and subjected to red eye correction in the same manner as described above.

If the above-described red eye correction ends for all of the designated frames, the representation on the screen of the display 20 changes to the aforementioned verification mode (See FIG. 5A). Note that in the case being described, the conditions for red eye correction of the frame for which red eye correction has been instructed are also set in the red eye correcting subsection 63 of the prescanned data processing section 54 and, therefore, the simulated image from the prescanned data has also been corrected for the red eye problem (See the steps S10 and S11 shown in FIG. 5).

In the next step, looking at the representation on the display 20, the operator checks (verifies), frame by frame, the image or the result of the image processing and, if necessary, manipulates the adjustment keys set on the keyboard 18a or the mouse 18b to adjust the color, density, gradation and other features of the image.

The inputs for this adjustment are sent to the key correcting subsection 74 which, in response to the entered inputs for adjustment, calculates the amounts of correction of the image processing conditions and sends them to the parameter coordinating subsection 76. In response to the supplied amounts of correction, the parameter coordinating subsection 76 adjusts the image processing conditions set in the prescanned data processing section 54 and the fine scanned data processing section 56. The parameter coordinating subsection 76 also calculates the conditions for performing the aforementioned correction and sets them at specified positions in the two processing sections. Hence, the image being represented on the display 20 also varies in response to this corrective measure, or the inputs for adjustment entered by the operator (See the step S12 shown in FIG. 4).

If the operator finds that the image in the frame of interest is appropriate (the result of the verification is OK), he or she enters an input to that effect using the keyboard 18a or some other suitable input device and performs verification of the next frame. In this manner, the operator verifies successive frames.

When the operator ends verification of all frames (or a specified number of frames), he or she instructs PRINT START using the keyboard 18a or some other suitable input device. As the result, the image processing conditions are finalized and in the scanner 12 the carrier 30 transports the film F at a speed determined for fine scan, causing fine scan to start. Therefore, in the embodiment under consideration, prior to fine scan, the film in the carrier 30 is rewound to the position that allows the image to be read from the first frame (See the steps S13 and S14 shown in FIG. 4).

If no one frame has been instructed for red eye correction, the first representation of a simulated image on the verification screen is immediately followed by the above-described procedure of verification. If no verification is to be performed, the image processing conditions are finalized at the point in time when the parameter coordinating subsection 76 ends the setting of the image processing conditions in the fine scanned data processing section 56 and thereafter fine scan is started. Whether verification, red eye correction and other steps should be performed or not is preferably determined in appropriately selectable modes.

Fine scan is performed in the same manner as the above-described fine scan for red eye correction; the output signals from the image sensor 34 are processed with the Amp 36, A/D converter 38, data processing section 46 and the log converter 48 to produce fine scanned data which is subsequently supplied to the fine scan memory 52.

The fine scanned data being sent to the fine scan memory 52 are successively read into the fine scanned data processing section 56, where image processing is done for each frame in the image processing subsection 66 under the finalized image processing conditions. Subsequently, the fine scanned data is transformed in the image data transforming subsection 68 to produce image data for output which is suitable for image recording with the printer 16. The data is then output to the printer 16 for print preparation.

In the fine scan mode described above, image may be read from all frames of the film F; alternatively, film reading may be omitted for those frames which have already been fine scanned for red eye correction, provided that the data for the previous fine scan is stored.

For preparing index prints, the following procedure may be taken: the prescanned data for all frames are stored in the prescan memory 50; the prescanned data for each frame is processed in the image processing subsection 62 under the associated image processing conditions; the frame for which red eye correction has been instructed is corrected for the red eye problem in the red eye correcting subsection 63 under the already set processing conditions; the corrected image data is sent to the data transforming subsection 68 of the fine scanned data processing section 56 to produce data suitable for output to the printer 16; at the same time, the image data for individual frames are so allocated as to be output to the printer 16 as image data for index prints.

As will be apparent from the foregoing description, the image processing method of the invention is so characterized that the prescanned image is used to designate a frame or frames that need be corrected for the red eye problem and that the fine scanned data is used to perform red eye correction (i.e., determine the relevant processing conditions). Because of this feature, red eye correction can advantageously be performed on simultaneous prints using image data of high resolution, with the result that prints having no red eye problem can be output in a consistent manner. Even if the customer is unable to know if the red eye problem has occurred in his or her film, a lab and other photo shops can offer high-quality services including red eye correction if it is necessary.

In the case described above, all frames are first prescanned and, thereafter, only the frame or frames for which red eye correction has been instructed are fine scanned before all frames including the corrected ones are fine scanned. This is not the sole case of the invention and various other embodiments (sequences) can be implemented. To name just one example, after all frames are prescanned, the frame or frames that need be red eye corrected are designated and verified so that all frames including the corrected ones are fine scanned and red eye corrected simultaneously.

In this alternative embodiment, the steps of prescan, setting the image processing conditions and the presentation of a verification screen are carried out in the same manner as described above. Looking at the verification screen, the operator designates which frame should be corrected for the red eye problem and then performs sequential verification, typically starting at the first frame (or in reverse order). The simulated image on the verification screen need not be provided for all frames of the film F and, if desired, a specified number of frames, say, six frames, may be successively displayed for verification. The frame to be subjected to red eye correction may be designated and verified simultaneously.

When a specified number of frames, say, all frames represented on the display, have been verified, the operator gives an instruction for starting the printing of the frames that have ended verification. In response to this instruction, the conditions for image processing (excluding red eye correction) of the associated frames are finalized and fine scan of those frames starts.

The fine scan is performed in the same manner as already described above; the output signals from the image sensor 34 are processed with the Amp 36, converted to a digital form with the A/D converter 38 and processed with the data processing section 46 and the log converter 48 to produce fine scanned data which is subsequently sent to the fine scan memory 52.

The fine scanned data for the individual frames that are being sent to the fine scan memory 52 are successively read into the fine scanned data processing section 56. In case of a frame or frames for which no instruction for red eye correction has been given, the fine scanned data is processed in the image processing subsection 66 under the finalized image processing conditions. Subsequently, the processed data simply passes unprocessed through the red eye correcting subsection 67, is transformed in the data transforming subsection 68 and output to the printer 16 for print preparation.

If the fine scanned data being stored in the fine scan memory 52 and read into the fine scanned data processing section 56 are for the frame or frames for which an instruction for red eye correction has been given, the image in the frame or frames is corrected for the red eye problem in the same manner as in the foregoing case.

To state specifically, the fine scanned data is processed in the image processing subsection 66 under the finalized image processing conditions and passes through the red eye correcting subsection 67 to be sent to the data transforming subsection 64 of the prescanned data processing section 54 so that it is transformed to a suitable form for representation on the display 20.

Looking at the image being displayed, the operator slices the eye region which the setup subsection 70 reads out of the fine scan memory 52 to determine the processing conditions for red eye correction. The determined processing conditions are set in the red eye correcting subsection 68 by means of the parameter coordinating subsection 76, whereupon the image being represented on the display 20 changes accordingly.

If the operator looking at the image of the frame being displayed finds that it has been appropriately corrected for the red eye problem, he or she enters an instruction to that effect. As the result, the destination of the fine scanned data processed in the red eye correcting subsection 67 is changed from the data transforming subsection 64 of the prescanned data processing section 54 to the data transforming subsection 68 of the fine scanned data processing section 56 and the processed data is transformed to image data suitable for printing with the printer 16; the image data is then sent to the printer 16 for preparation of a print of the frame of interest. In addition, the fine scanned data processing section 56 starts to process the next frame. When preparing index prints, the conditions for red eye correction are also set in the red eye correcting subsection 63 of the prescanned data processing section 54.

Fine scan may be suspended as long as red eye correction is performed in the manner described above. Alternatively, if the fine scan memory 52 has a sufficient capacity, fine scan may be performed parallel with the process of red eye correction to store the fine scanned data on the subsequent frames.

The following is yet another embodiment of the present invention. In the first embodiment, fine scan of the frame or frames to be corrected for the red eye problem precedes that of the frame or frames that need not be corrected for the red eye problem. In the embodiment under consideration, the order is reversed and fine scan of the frame or frames that need not be corrected for the red eye problem is performed prior to that of the frame or frames to be corrected for the red eye problem.

In this embodiment, the steps of prescan, setting the image processing conditions and the presentation of the verification screen are also carried out in the same manner as already described above. Looking at the verification screen, the operator designates which frame or frames need be corrected for the red eye problem and then performs sequential verification, typically starting at the first frame (or in reverse order). As in the previous case, the simulated image need not be presented for all frames and verification may be performed simultaneously with the designation of the frame or frames that need be corrected for the red eye problem.

When the verification of a given number of frames ends, the operator gives an instruction to start printing of the verified frames. In response to this instruction, the image processing conditions for the pertinent frames are finalized and fine scan of those frames starts, whereupon only the frames that have not been given an instruction for red eye correction are fine scanned in succession.

The fine scan is performed in the same manner as in the foregoing case; the output signals from the image sensor 34 are amplified with the Amp 36 and processed with the A/D converter 38, the data processing section 46 and the log converter 48 to produce fine scanned data, which are sent to the fine scan memory 52 and successively read into the fine scanned data processing section 56; the data are processed frame by frame in the image processing subsection 66 under the finalized image processing conditions, simply passes unprocessed through the red eye correcting subsection 67 and are processed in the image data transforming subsection 68 to be transformed to image data for output, which is subsequently output to the printer 16 for print preparation.

Thus, all frames that have not been given an instruction for red eye correction are fine scanned; following this step, the film F on the carrier 30 in the scanner 12 is rewound by the required amount and the frames that have been given an instruction for red eye correction are fine scanned. The method of fine scan is the same as that applied to the frames that were not given an instruction for red eye correction and the fine scanned data is stored in the fine scan memory 52.

The subsequent steps are performed in the same manner as with the frames that were corrected for the red eye problem in the foregoing case; the fine scanned data stored in the fine scan memory 52 are processed with the image processing subsection 66, passes unprocessed through the red eye correcting subsection 67, are transformed in the data transforming subsection 64 of the prescanned data processing section 54 and represented on the display 20. Looking at the displayed image, the operator slices the eye region which is read with the setup subsection 70 to determine the processing conditions for red eye correction; the determined conditions are set in the red eye correcting subsection 68, whereupon the image being represented on the display 20 changes accordingly.

If the result of red eye correction is appropriate, the operator gives an instruction to print the corrected frames; as the result, the destination of the fine scanned data processed in the red eye correcting subsection 67 is changed to the data transforming subsection 68 of the fine scanned data processing section 56 and the data is transformed to a suitable form for the printer 16, to which it is sent for preparing the required prints. To prepare index prints, the red eye correcting conditions are also set in the red eye correcting subsection 63 of the prescanned data processing section 54.

While the image processing method of the invention has been described above in detail, the foregoing embodiments are not the sole examples of the invention and various improvements and modifications are of course possible without departing from its spirit and scope.

As described in detail on the foregoing pages, the image processing method of the invention enables the operator to designate a frame or frames that need be corrected for the red eye problem while looking at the image being represented on the display; in addition, the intended red eye correction can be accomplished using fine scanned data of high resolution. Therefore, according to the present invention, red eye correction can be performed in an appropriate manner when preparing simultaneous prints and those prints which reproduce high-quality image having no red eye can be output consistently.

What is claimed is:

1. An image processing method comprising the steps of:
   performing prescan for capturing an image on a film at low resolution;
   determining image processing conditions using image data obtained by prescan;
   performing fine scan for capturing the image on the film at high resolution; and
   obtaining output image data by processing fine scanned image data in accordance with said image processing conditions;
   wherein the image captured with said prescan is represented on a display and used to select a frame or frames to be subjected to red eye correction, red eye correcting conditions for a particular frame among the thus selected frame or frames are set based on the fine scanned data of said particular frame and said particular frame among said selected frame or frames are subjected to said red eye correction in accordance with said red eye correcting conditions.

2. The image processing method according to claim 1, wherein said fine scan is performed after all frames of the film have ended prescan and the frame or frames designated for said red eye correction are subjected to fine scan before any other frames or, alternatively, all frames are fine scanned consecutively.

3. The image processing method according to claim 1, wherein either the fine scanned image data or the prescanned image data or both are used to represent a result of said red eye correction on the display.

4. The image processing method according to claim 1, wherein image data for index prints is prepared using the prescanned data and the prescanned data that has been subjected to said red eye correction is used to prepare the index prints for the frame or frames that have been designated for said red eye correction.

5. The image processing method according to claim 1, wherein the image data represented on the display is changed from the prescan image data to the fine scanned data for a particular frame.

* * * * *